(12) United States Patent
Bashir et al.

(10) Patent No.: US 8,161,142 B2
(45) Date of Patent: Apr. 17, 2012

(54) ADDRESSING NODE FAILURE DURING A HYPERSWAP OPERATION

(75) Inventors: Ahmed Mohammad Bashir, San Jose, CA (US); Prasenjit Sarkar, San Jose, CA (US); Soumitra Sarkar, Cary, NC (US); Mark James Seaman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 12/605,758

(22) Filed: Oct. 26, 2009

(65) Prior Publication Data
US 2011/0099360 A1    Apr. 28, 2011

(51) Int. Cl.
*G06F 15/177* (2006.01)
(52) U.S. Cl. ......... 709/222; 709/220; 709/221; 709/223
(58) Field of Classification Search .................. 709/222, 709/220, 221, 223
See application file for complete search history.

(56) References Cited

U.S. PATENT DOCUMENTS

| | | |
|---|---|---|
| 5,668,943 A | 9/1997 | Attanasio et al. |
| 5,790,775 A | 8/1998 | Marks et al. |
| 6,253,209 B1 * | 6/2001 | Chase-Salerno et al. ..... 709/201 |
| 6,292,905 B1 | 9/2001 | Wallach et al. |
| 6,578,158 B1 | 6/2003 | Deitz et al. |
| 6,601,187 B1 | 7/2003 | Sicola et al. |
| 6,738,832 B2 | 5/2004 | Burr et al. |
| 6,912,621 B2 | 6/2005 | Harris |
| 2002/0112198 A1 | 8/2002 | Lim et al. |
| 2003/0028514 A1 | 2/2003 | Lord et al. |
| 2003/0204772 A1 | 10/2003 | Petersen et al. |
| 2006/0212750 A1 * | 9/2006 | Denninghoff et al. ........... 714/6 |
| 2007/0067613 A1 | 3/2007 | Mizoguchi |
| 2007/0157016 A1 * | 7/2007 | Dayan et al. ..................... 713/2 |
| 2007/0168711 A1 | 7/2007 | Chen |
| 2007/0294493 A1 | 12/2007 | Buah et al. |

OTHER PUBLICATIONS

"IBM Hyperswap Technology." Jul. 28th, 2008. IBM Advanced Technical Support, Americas. pp. 1-18.*

* cited by examiner

*Primary Examiner* — Larry Donaghue
*Assistant Examiner* — Nicholas Taylor
(74) *Attorney, Agent, or Firm* — Lieberman & Brandsdorfer, LLC

(57) ABSTRACT

A method, system, and article are provided to enable a Hyperswap operation in a clustered computer system. Each node in the system is configured with flash memory, with a hierarchical list of boot volumes therein. Following a Hyperswap operation, the current boot volume is communicated to each node in the cluster and each node joining the cluster. All previously inactive nodes that were booted from the improper boot volume are re-booted from the correct and the flash memory is amended to reflect the correct boot volume.

17 Claims, 5 Drawing Sheets

ADDRESSING NODE FAILURE DURING A HYPERSWAP OPERATION

BACKGROUND OF THE INVENTION

1. Technical Field

This invention relates to a distributed multi-processing computer system in communication with a plurality of storage devices. More specifically, the invention relates to employment of a Hyperswap operation, and addressing failure of one or more nodes during the Hyperswap operation.

2. Background of the Related Art

In computer science, a cluster is a group of computers, also known as nodes, that work together to form a single computer system. There are different categories of clusters, including, but not limited to, a high availability cluster and grid cluster. The high availability cluster is employed to improve the availability of the services of the cluster wherein each member of the cluster is in communication with a plurality of storage devices. In a high availability cluster, it is desirable to provide application resilience across storage failure when, from time to time, storage devices may fail. Failure of a storage device may cause disruption to the system if critical data is maintained on the failed or failing storage device, since, even if an up to date replica of the data is maintained in another storage system using synchronous storage replication, applications have to be stopped and restarted before they can use the replica data, and such application outage can be unacceptable in some enterprise environments.

Hyperswap is a continuous availability solution wherein a set of nodes accessing a synchronously replicated storage system, containing a group of storage volumes, switch from a primary storage system to a secondary (replica) storage system, and must do so without any application outage in any node in the cluster. The Hyperswap operation may take place because of a storage system failure, known as an unplanned Hyperswap, or under administrative control, known as a planned Hyperswap. Furthermore, the Hyperswap operation may involve both boot volumes and non-boot volumes in the storage system.

FIG. 1 is a flow chart (100) illustrating an example of a prior art Hyperswap operation in a clustered environment that can lead to a system error. The example cluster consists of at least two nodes in communication with a storage subsystem having one or more storage volumes on a primary storage system, and corresponding replica volumes on a secondary system (102). Each node in the cluster boots from a (boot) volume in the primary storage system with a replica in the secondary storage system (104). A third node in the cluster is in a temporary off-line state (106). A Hyperswap operation is invoked (108), wherein the boot volumes residing in the primary storage system are no longer valid for access and instead, the replicas of those volumes in the secondary storage system are the preferred volumes. This occurs while the third node is off-line, as a result of which, the third node is not aware of the Hyperswap operation. At some point in time after the Hyperswap operation has completed, the third node comes on-line and tries to boot from the boot volume local to the primary storage system (110). Even if that boot volume on the primary storage system is accessible after the Hyperswap operation, this boot volume is not valid for access. More specifically, all updates to boot images on boot volumes for nodes in the cluster, made by an administrator, will be made on the secondary storage system. Since there is no central shared memory (in general purpose computing systems without specialized architectures) in the cluster to reference the location of the boot volume, the third node will boot from the wrong boot volume in the primary storage system (110). Accordingly, there is no element in the cluster computing environment to communicate boot volume relocation to a node that was either off-line or in the process of coming on-line during the Hyperswap operation.

One solution to the problem presented in FIG. 1 is to provide a centralized shared memory facility that always contains the correct boot volume that is to be used by each node on reboot. However, such centralized memory is not available for leveraging in a clustered environment. Accordingly, there is a need for a solution that supports the Hyperswap operation in a clustered environment that communicates the correct boot volume to any node that was off-line or in the process of coming on-line, i.e. rejoining the cluster, during a Hyperswap operation, to ensure that the affected node(s) boot from the correct boot volume as they come on-line and join the cluster.

SUMMARY OF THE INVENTION

The embodiment of the present invention comprises a method, system, and article for supporting a Hyperswap operation in a clustered environment that accommodates all current and future cluster member nodes at all stages of booting.

In one aspect of the invention, a method is provided for accommodating a Hyperswap operation in an open system that solves the boot volume access problem for offline nodes without specialized hardware components such as centralized shared memory. Each node in a cluster is configured with a listing of two or more boot volumes. The listing for each node is stored in flash memory of each node, with the boot volume list including a first logical path between a node and a primary storage subsystem, and a second logical path between the node and a secondary storage subsystem. The first logical path points to the preferred boot volume, while the second logical path points to a non-preferred boot volume. In response to a Hyperswap operation, the roles of the first and second logical paths are changed for each node participating in the Hyperswap operation. The role changes include directing the first logical path to the non-preferred boot volume on the secondary storage subsystem, and directing the second logical path to the preferred boot volume in the primary storage subsystem.

In another aspect of the invention, a computer system is introduced to manage the Hyperswap operation on a cluster with two or more nodes. Each node in the cluster is in communication with a management node. A list of at least two boot volumes is maintained on each node in flash memory. This list includes a first logical path between a node and a primary storage subsystem, and a second logical path between the node and a secondary storage subsystem. The first logical path is directed to the preferred boot volume, and the second logical path is directed to a non-preferred boot volume. It is the responsibility of the manager node to keep track of the roles of the first and second logical paths to the boot volumes in response to a Hyperswap operation that affects each node in the cluster, including nodes that are offline. When a Hyperswap operation occurs and all nodes in the cluster are supposed to access the secondary storage system, it is the job of the manager node to communicate the information that the first logical path to the boot volume is the replica on the secondary storage subsystem, and that the second logical path to the preferred boot volume is on the primary storage subsystem, to each cluster node that queries it for boot volume information.

In yet another aspect of the invention, an article is provided with a computer-readable carrier including computer program instructions configured to accommodate a Hyperswap operation in an open system. Instructions are provided to configure each node in a cluster with a listing of two boot volumes, and to store the listing of the boot volumes for each node in flash memory of each node. The listing defines the boot volume list as having a first logical path between a node and a primary storage subsystem, and a second logical path between the node and a secondary storage subsystem. The first logical path is directed to the preferred boot volume and the second logical path is directed to a non-preferred boot volume. Instructions are provided to change the roles of the first and second logical paths in response to a Hyperswap operation for each node participating in the Hyperswap operation. The instructions to change the roles of the logical paths include directing the first logical path to the non-preferred boot volume on the secondary storage subsystem, and directing the second logical path to the preferred boot volume in the primary storage subsystem.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DETAILED DESCRIPTION

Figure 1:
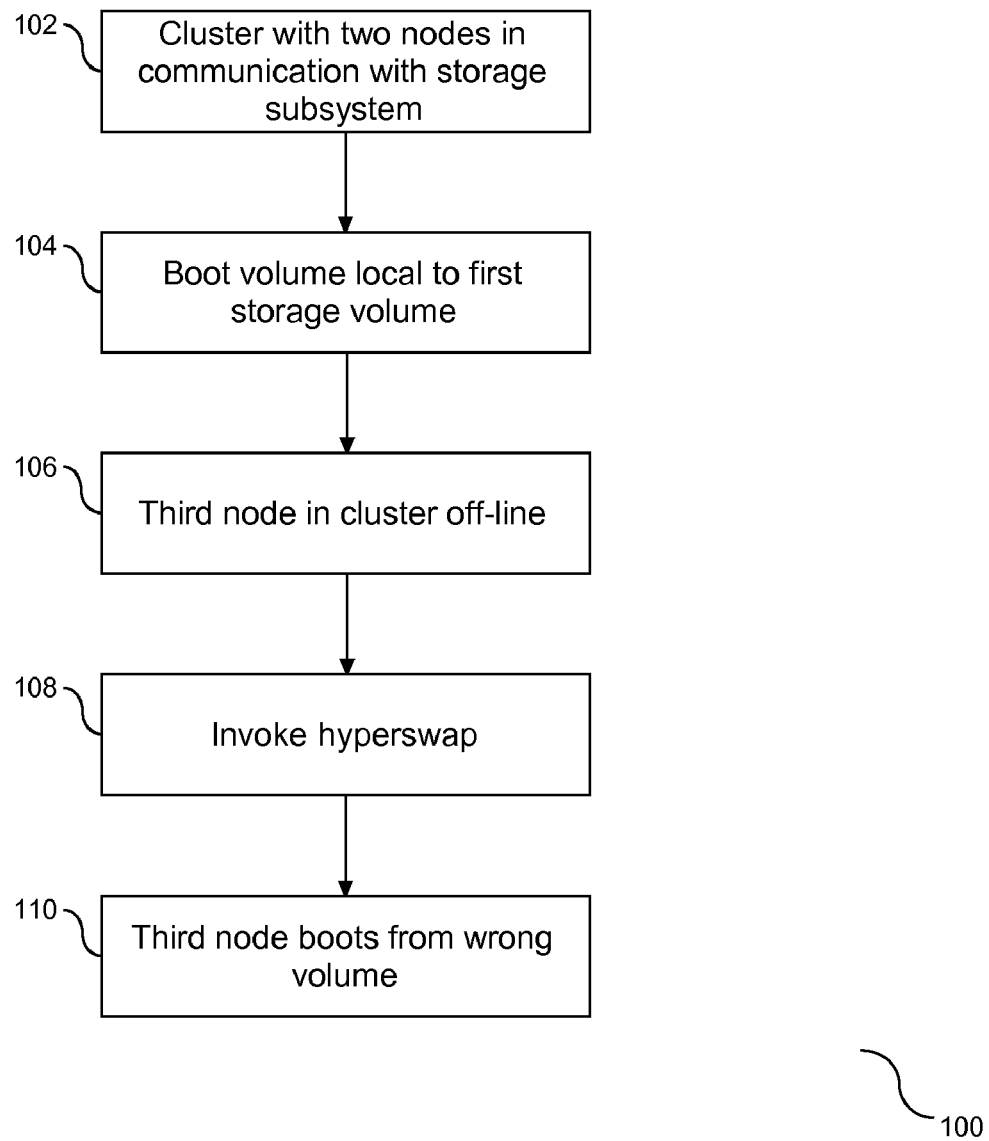
FIG. 1 is a prior art flow chart illustrating the shortcomings of the Hyperswap operation in a clustered environment.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and engines. A manager or engine may be implemented in programmable hardware devices such as field programmable gate arrays, programmable array logic, programmable logic devices, or the like. The manager or engine may also be implemented in software for execution by various types of processors. An identified manager or engine of executable code may, for instance, comprise one or more physical or logical blocks of computer instructions which may, for instance, be organized as an object, procedure, function, or other construct. Nevertheless, the executables of an identified manager or engine need not be physically located together, but may comprise disparate instructions stored in different locations which, when joined logically together, comprise the manager or engine and achieve the stated purpose of the manager or engine.

Indeed, a manager or engine of executable code could be a single instruction, or many instructions, and may even be distributed over several different code segments, among different applications, and across several memory devices. Similarly, operational data may be identified and illustrated herein within the manager and/or engine, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of booting a node in a computer cluster experiencing a planned or unplanned Hyperswap operation to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Technical Details

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the spirit and scope of the present invention.

Figure 2:
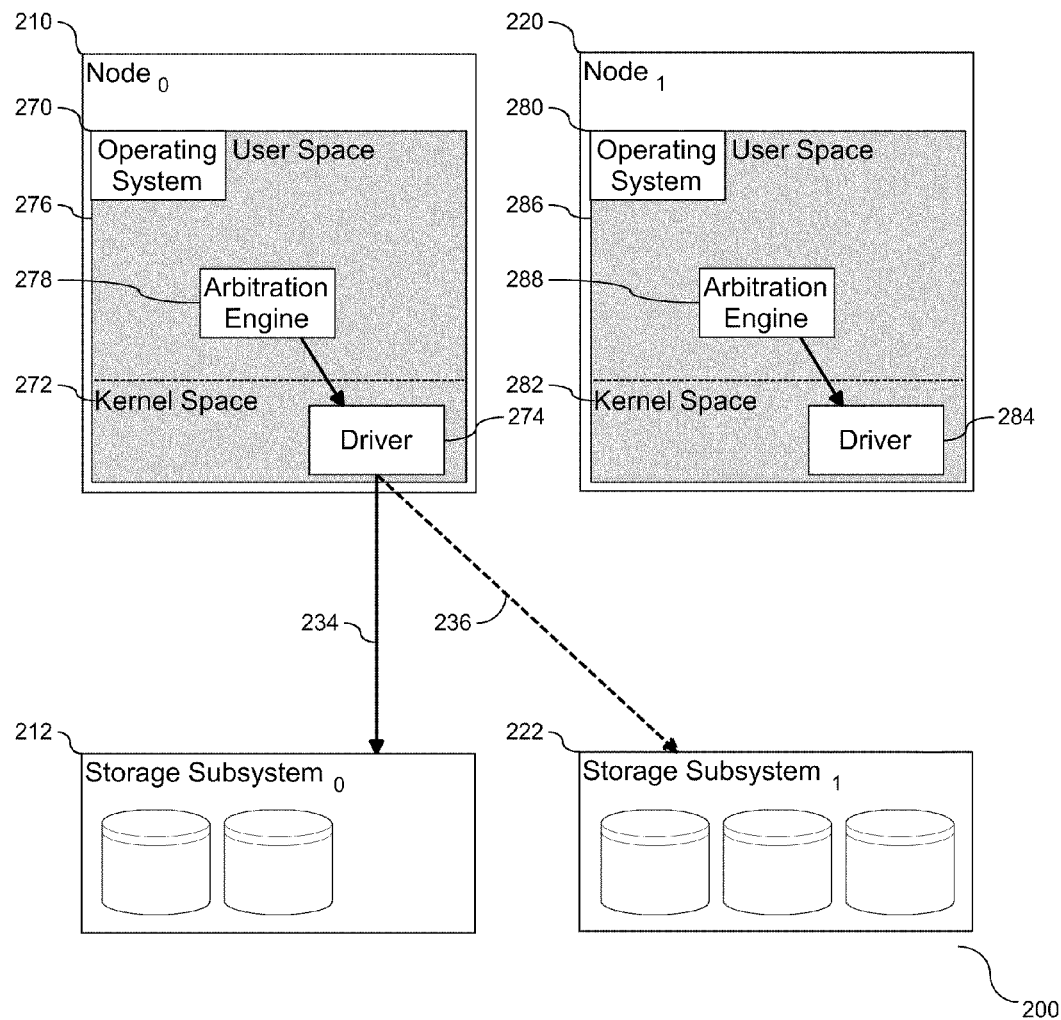
FIG. 2 is a block diagram of nodes in a computer cluster with components that support a Hyperswap operation.

FIG. 2 is a block diagram (200) of a computer cluster with components therein to support the Hyperswap operation while accommodating the assignment of the preferred boot volume to the active storage system. As show, there are at least two nodes in the cluster, a first node (210) and a second node (220), and at least two storage subsystems, a first storage subsystem (212) and a second subsystem (222). Each of the first and second storage subsystems (212) and (222), respectively, may include one or more storage volumes. In one embodiment, the computer cluster (200) may be expanded to include additional nodes and storage subsystems. The first storage subsystem (212) is the source of all synchronous mirroring relationships, and the second storage subsystem (222) is the target of all synchronous mirroring relationships. Each of the nodes (210) and (220) are configured to support the Hyperswap operation. Accordingly, each cluster member has a storage dependency on at least one storage volume in the first storage subsystem (212), with each volume in the first storage subsystem (212) linked by a synchronous mirroring relationship to an identical set of volumes in the second storage subsystem (222).

As shown, the first node (210) has an operating system (270) with kernel space (272) and user space (276). Similarly, the second node (220) has an operating system (280) with kernel space (282) and user space (286). In one embodiment, the cluster is expanded to include additional nodes, with each node configured with an operating system with kernel space and user space. Access to storage by an application in any node is gated through an extended device driver in the kernel space. With respect to the elements in FIG. 2, node (210) has extended device driver (274) in the kernel space (272) and node (220) has extended device driver (284) in kernel space (282). In the prior art, a device driver in the kernel space manages multiple paths to a single storage system volume, virtualizing all paths from the node's operating system to that volume as a single device visible to a logical volume manager. The extended device drivers (274) and (284) in the first and second nodes (210) and (220), respectively, that are required for the preferred embodiment of this invention, address management of at least two logical paths from each of the nodes (210) and (220) in the cluster to two separate volumes in the two storage systems, whose contents are kept synchronized via synchronous storage system replication. More specifically, as shown herein with respect to node (210), the extended device driver (274) is shown addressing a first logical path (234) to a volume in the primary storage subsystem (212), and a second logical path (236) to the replica volume in the secondary storage subsystem (222). Accordingly, all paths from the node operating system to a volume and its replica are virtualized as a single device.

The extended device drivers (274), (284) facilitate the management of the logical paths and for each node in the cluster (200) for a Hyperswap operation. More specifically, the extended device driver (274), (284) of the first and second nodes (210), (220), respectively, enables the virtualization of each primary volume and its replica as a single device in the node operating system. Each logical path can be made up of multiple physical paths to each storage system. When a Hyperswap operation is performed, the two logical paths change roles, so that access to all storage volumes is directed to the secondary storage subsystem (222). The access is switched back to the primary storage subsystem (212) only when a failback operation is performed. In one embodiment, a manager is employed to change the roles of the logical paths, such that one logical path is directed to the non-preferred boot volume on a secondary device and a second logical path is directed to a preferred boot volume on the primary storage subsystem. Furthermore, during a reboot of a third node that was previously inactive during the Hyperswap operation, the manager may be employed to change the ordering of the logical paths in this third node. Accordingly, the extended device driver in kernel space directs storage request along logical paths between the node and the preferred storage subsystem.

In addition to the device driver local to the kernel, a management component is employed local to the user space of each node. More specifically, the user space (276) of the first node (210) is provided with an Arbitration Engine (278), and the user space (286) of the second node (220) is provided with an Arbitration Engine (288). The Arbitration Engines (278), (288) are in communication with the extended device drivers (274), (284), respectively, in the kernel space of the respective nodes, and also to the external management component running in another node in the cluster, to control clustered Hyperswap across all affected storage subsystems and nodes.

The Arbitration Engines (278), (288) residing in user space are configured to execute in non-paged memory. This configuration is required so that a storage subsystem failure cannot inhibit operation of the node-based code by preventing paging-in of swapped out code if the paging volume is in the failed storage subsystem. The extended device drivers (274), (284) residing in the kernel space (272), (282) are also configured to execute in non-paged memory. The configuration of the extended device drivers (274), (284) together with the configuration of the arbitration engines (278), (288) residing in the user space (276), (286), respectively, support the requirements for handling storage subsystem failure.

Figure 3:
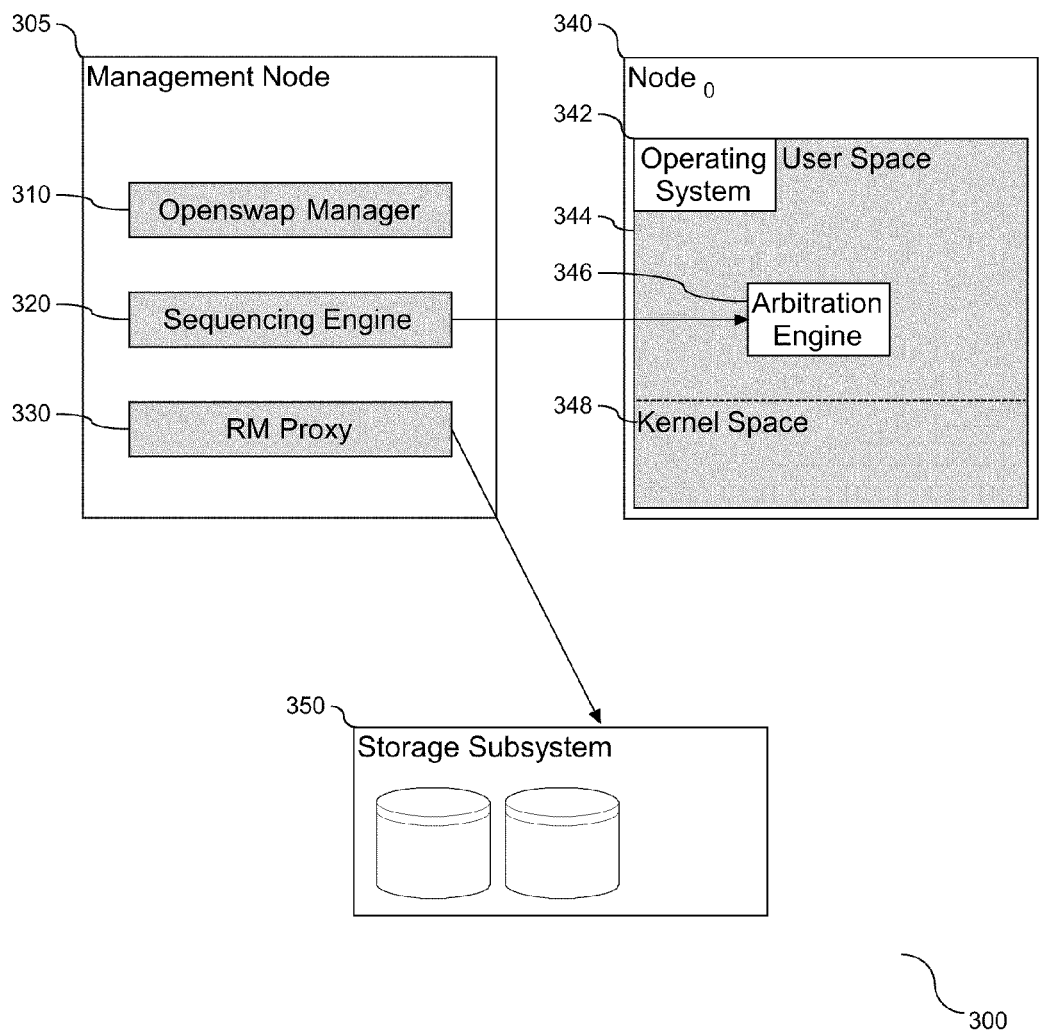
FIG. 3 is a block diagram of management components, residing in a separate node in the cluster, that are employed to support coordination of the Hyperswap operation across all nodes in the cluster

FIG. 3 is a block diagram (300) of the management components in communication with the respective node and storage subsystem. There are three components shown herein local to a management node (305), including an OpenSwap manager (310), a sequencing engine (320), and a Replication Manager (RM) proxy (330). Each of the management components (310), (320), and (330) reside external to the management node (305) in that no application that is to be protected for continuous availability by the Hyperswap operation runs on the node running the management components. The management components can therefore execute in paged memory. The OpenSwap manager (310) provides an interface to manage Hyperswap configuration. In one embodiment, the interface is a web-based interface. Administration features of the OpenSwap manager (310) include, but are not limited to Hyperswap configuration establishment, initialization of the configuration, initiation of a planned Hyperswap operation, initiation of a failback operation, display of current system status, and browsing of operational logs. The Sequencing Engine (320) communicates with the Arbitration Engine (346) in the user space (344) of each node (340) in the cluster. More specifically, the Sequencing Engine (320) implements the centralized state machine for coordinating Hyperswap operations across one or more nodes in the storage cluster. The Sequencing Engine (320) leverages the RM Proxy component (330) to issue copy services (storage replication management) commands to the storage subsystems (350) that are involved in a Hyperswap operation. The RM Proxy component (330) uses an application program interface (API) to manage synchronous mirroring relationships and the state of the storage subsystem (350) components during both planned and unplanned Hyperswap operations. In one embodiment, the RM Proxy component (330) uses the same API calls to query synchronous mirroring relationships on a storage subsystem during Hyperswap configuration establishment.

Figure 4:
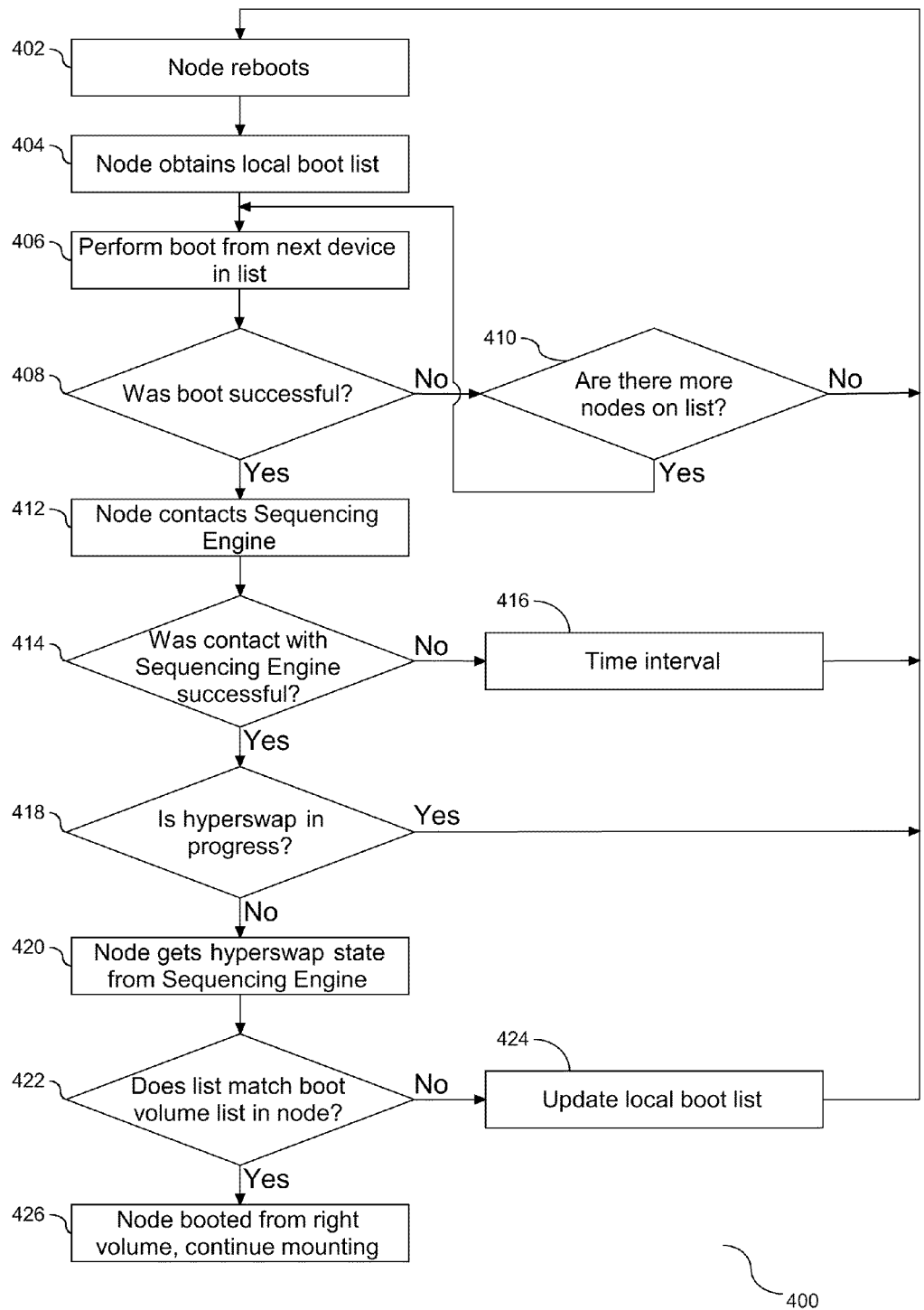
FIG. 4 is a flow chart illustrating the process for supporting the Hyperswap operation for a node in the process of booting during or after the Hyperswap operation, according to the preferred embodiment of this invention, and is suggested for printing on the first page of the issued patent.

Prior to a Hyperswap operation, every node in the system has a list of boot devices ordered by priority. Each node boots from the first device in the list based upon the hierarchical representation of the boot devices, and if the boot fails, the node proceeds down the list. When a Hyperswap operation is performed, the list of boot devices for every node operating in the system is changed. More specifically, after a Hyperswap operation, the boot volume list on every online node that participates in the Hyperswap operation is changed to designate the preferred path to the boot volume to be the one on the secondary device. As a result, every node that was online during the Hyperswap operation will know that it must boot from the boot volume in the secondary device. FIG. 4 is a flow chart (400) which describes how a node, that was offline during Hyperswap, adjusts its boot volume list after it comes online. A node reboots (402). While executing the preliminary stage of booting by running the Basic Input Output System (BIOS) code, the node obtains a local boot list from non-volatile memory (404). A boot is performed from the next device in the list (406). If the boot is not successful, the node tries to boot from the next device in the list (406). If there are no more devices to try in the boot list and booting is not yet successful, then it must be the case that all boot volumes are unreachable, in which case, the node reboots itself to start the whole boot process all over again (402). Conversely, if the booting is successful, the node contacts the Sequencing Engine (410). However, if the node cannot contact the Sequencing Engine (414), either because of a networking problem or because the Sequencing Engine itself is offline, then after an appropriate wait period, the node reboots itself to restart the whole process (402). If the Sequencing Engine can be contacted and it communicates to the node that a Hyperswap operation is currently in progress (416), the node reboots itself (402) since the state is in flux. However if that is not the case, then the node gets the current Hyperswap state from the Sequencing Engine. The process of getting the Hyperswap state includes learning which storage system is primary, which is secondary, and accordingly, what is the new ordered list of boot volumes. If the list matches the current boot volume list in the node, then the node has booted from the right volume. The Hyperswap direction and state information are obtained from the Sequence Engine, followed by a continued mounting of other devices that the node's operating system (422) is configured to access. However if the Sequence Engine-provided boot list does not match the node's local list, then the local boot list is updated (424) and the node is subject to a reboot (402).

Figure 5:
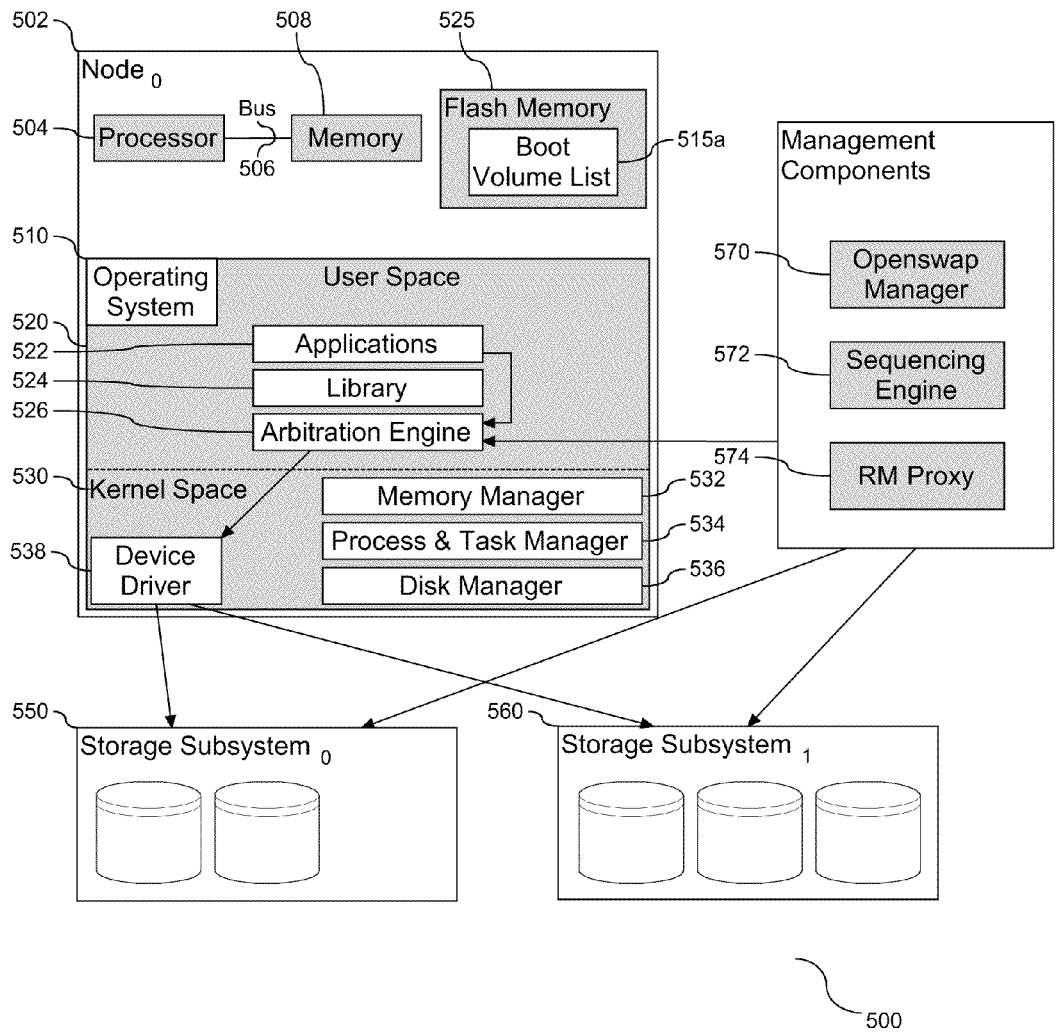
FIG. 5 is a block diagram showing components in cluster nodes and the management node that support the Hyperswap operation.

As shown in FIGS. 2 and 3, each node in the cluster environment is modified to support a Hyperswap operation. FIG. 5 is a block diagram (500) of a computer system illustrating the tools that are embedded in both the user and kernel space of each node of the cluster environment. For purposes of illustration and explanation, only one node in the cluster is shown and described. As shown, a node (502) is provided in communication with at least two storage subsystems (550) and (560). The node (502) is shown with a processor (504) in communication with memory (508) across a bus (506). The processor (504) is in communication with an operating system (510) which includes both user space (520) and kernel space (530). The user space (520) is the portion of the operating system which executes and supports user processes. As shown herein, the user space (520) includes applications (522) and libraries (524). In contrast, the kernel space (530) is the central module of the operating system (510) and is the part of the operating system that loads first and remains in main memory. In one embodiment, the kernel (530) is responsible for memory management (532), process and task management (534), and disk management (536). Furthermore, to support the Hyperswap operation, the kernel space (530) is modified to include a device driver (538), and the user space (520) is modified to include an Arbitration Engine (526). Both the application (522) and the Arbitration Engine (526) are in communication with the storage subsystems (550) and (560) via the device driver (538). The node (502) is configured with flash memory (525) to store a list of boot volumes (515a). The flash memory (525) identifies both a preferred boot volume and a non-preferred boot volume in the at least two storage subsystems (550) and (560).

In addition to the modification of the node cluster members, a set of management components (570), (572), and (574) are provided in communication with the cluster, but remote from the individual node cluster members, to support the Hyperswap operation. The set of management components includes, but are not limited to, an Openswap Manager (570), a Sequencing Engine (572), and a RM Proxy (574). Details of the supporting roles of the management components are described with respect to FIG. 3. In one embodiment, the management components (570)-(574) reside outside of the storage cluster, and are configured to communicate with both the Arbitration Engine (526) in the user space (520) and the storage subsystems (550) and (560). The management components (570)-(574) may be provided in the form of software components local to memory, or hardware components that reside external to memory. The Arbitration Engine (526) and the device driver (538) are shown as software components that reside in the respective layers of the operating system. However, the invention should not be limited to a software embodiment. For example, in one embodiment, the Arbitration Engine (526) and/or the device driver (538) may be in the form of hardware tools. Accordingly, the tools that are provided to support the Hyperswap operation may come in the form of software tools, hardware tools, or a combination of software and hardware tools.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical medium, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages of the Exemplary Embodiment Over the Related Art

The Hyperswap operation supports changing the path to the volumes that a node's operating system devices are using, from a primary storage system to one or more storage systems where these volumes are being synchronously and seamlessly replicated, such that applications running in that node and performing I/O to those volumes do not sense the failover, either planned or unplanned. The Hyperswap operation shown herein can be used in open systems to support Hyperswap operations across a cluster in the presence of offline nodes, without requiring any custom hardware. In the context of this application, an open system is any general purpose computing system based on an architecture whose interfaces are publicly available. The invention addresses the problem that when the node that was offline during Hyperswap is rebooted to rejoin the cluster, it must boot from the proper boot image in the storage volume. The user and kernel space of each node are each modified with a tool to support the management of the Hyperswap operation. In addition, a management component is provided to communicate with the tool in the user space to track the state of the boot volumes in the storage subsystems. These additional tools support a Hyperswap operation in a distributed system, wherein each node in the cluster may join the cluster or re-boot during or after a Hyperswap operation, and will boot from the correct boot image. Accordingly, the Hyperswap operation is supported without a central shared memory to hold the boot image.

Alternative Embodiments

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method accommodating a failure of a primary storage subsystem in a cluster system, comprising:
   configuring each node in a cluster with a listing of two boot volumes;
   storing the listing of the boot volumes for each node in flash memory of each node, including defining the boot volume list as comprising a first logical path between a node and the primary storage subsystem, and a second logical path between the node and a secondary storage subsystem, wherein the first logical path points to a boot volume on the primary storage subsystem and the second logical path points to a boot volume on the secondary storage subsystem;
   changing the roles of the first and second logical paths in response to the failure of the primary storage subsystem and switching access of each node in communication with the primary storage subsystem to the secondary storage subsystem; and
   during reboot of a third node that was inactivate during the switching access operation, changing the ordering of the first and second logical paths in the listing of two boot volumes local to the third node in response to a management node directing the third node to use the secondary path to obtain a boot volume for the third node.

2. The method of claim 1, further comprising for the third node that was inactive during the switching access operation, consulting the listing of boot volumes in local flash memory and booting the node from the first logical path identified in the flash memory.

3. The method of claim 2, further comprising consulting a management node for determining an identity of the logical path to a boot volume as well as a location of data volumes, before accessing any data volumes.

4. The method of claim 3, further comprising modifying a list of logical paths to boot volumes in flash memory of the rebooted node to reflect an accurate ordering of the first and second logical paths.

5. The method of claim 4, further comprising in response to an incorrect listing of logical paths to boot volumes for a node, rebooting the node after correcting the listing of logical paths.

6. The method of claim 1, further comprising the step of changing the roles of the first and second logical paths for each active node in the cluster.

7. A computer system, comprising:
   a computer cluster with at least two nodes, each node in communication with an associated processor and flash memory, and each node in communication with a management node;
   a list of least two boot volumes maintained in flash memory of each node; the flash memory to store the list of boot volumes for each node, including a first logical path between a node and a primary storage subsystem, and a second logical path between the node and a secondary storage subsystem, wherein the first logical path points to a boot volume on the primary storage subsystem and the second logical path points to a boot volume on the secondary storage subsystem;
   a manager to change the roles of the first and second logical paths responsive to the failure of the primary storage subsystem and switching access of each node in communication with the primary storage subsystem to the secondary storage subsystem; and
   during a reboot of the third node that was inactive during the switching access operation, the manager to change the ordering of the first and second logical paths in the third node in response to a management node directing the third node to use the secondary path to obtain a boot volume for the third node.

8. The system of claim 7, further comprising for the third node that was inactive during the switching access operation, a node manager to consult the listing of boot volumes in local flash memory and boot the node from the first logical path identified in the flash memory.

9. The system of claim 8, further comprising the manager to consult a management node to determine an identity of the logical path to the a boot volume as well as a location of data volumes, before accessing any data volumes.

10. The system of claim 9, further comprising the manager to modify a list of logical paths to boot volumes in flash memory of the rebooted node to reflect an accurate order of the first and second logical paths.

11. The system of claim 10, further comprising in response to an incorrect listing of logical paths to boot volumes for a node, the node manager to reboot the node after correcting the listing of logical paths.

12. An article comprising: a computer-readable medium including computer program instructions configured to accommodate a failure of a primary storage subsystem in an open system, comprising:

instructions to configure each node in a cluster with a listing of two boot volumes; instructions to store the listing of the boot volumes for each node in flash memory of each node, wherein the listing defines the boot volume list as comprising a first logical path between a node and a primary storage subsystem, and a second logical path between the node and a secondary storage subsystem, wherein the first logical path points to a boot volume on the primary storage subsystem and the second logical path points to a boot volume on the secondary storage subsystem;

instructions to change the roles of the first and second logical paths in response to the failure of the primary storage subsystem, including reconnecting each node having communication with the primary storage subsystem to the secondary storage subsystem; and during reboot of a third node that was inactivate during the switching access operation, instructions to change the ordering of the first and second logical paths in the third node in response to a management node directing the third node to use the secondary path to obtain a boot volume for the third node.

13. The article of claim 12, further comprising for the third node that was inactive during the switching access operation, instructions to consult the listing of boot volumes in local flash memory and booting the node from the first logical path identified in the flash memory.

14. The article of claim 13, further comprising instructions to consult a management node to determine an identity of the logical path to a boot volume as well as a location of data volumes, before accessing any data volumes.

15. The article of claim 14, further comprising instructions to modify a list of logical paths to boot volumes in flash memory of the rebooted node to reflect an accurate ordering of the first and second logical paths.

16. The article of claim 15, further comprising in response to an incorrect listing of logical paths to boot volumes for a node, instructions to reboot the node after correcting the listing of logical paths.

17. A method accommodating a failure of a primary storage subsystem in a cluster computer system, comprising:

storing a list of boot volumes for each node in flash memory local to each node;

defining the boot volume list as comprising a first logical path between a node and a primary storage subsystem, and a second logical path between the node and a secondary storage subsystem, wherein the first logical path points to a boot volume in the primary storage subsystem and the second logical path points to a boot volume in the secondary storage subsystem;

changing the roles of the first and second logical paths in response to the failure of the primary storage subsystem, including switching access of each node in communication with the primary storage subsystem to the secondary storage subsystem;

during boot of a third node that was inactivate during the switching access operation, reordering the first and second logical paths in the third node in response to a management node directing the third node to use the secondary path to obtain a boot volume for the third node; and the third node booting from a boot volume assigned to the second logical path.

* * * * *